(12) United States Patent
Nakayama

(10) Patent No.: US 6,901,166 B1
(45) Date of Patent: May 31, 2005

(54) IMAGE SCANNER AND OPTICAL CHARACTER RECOGNITION SYSTEM USING SAID IMAGE SCANNER

(76) Inventor: Mitsuo Nakayama, 4-13-3 Shibaura, Minato-ku, Tokyo (JP)

( * ) Notice: Subject to any disclaimer, the term of this patent is extended or adjusted under 35 U.S.C. 154(b) by 0 days.

(21) Appl. No.: 09/830,639

(22) PCT Filed: Oct. 27, 1999

(86) PCT No.: PCT/JP99/05945

§ 371 (c)(1),
(2), (4) Date: Jun. 25, 2001

(87) PCT Pub. No.: WO00/26851

PCT Pub. Date: May 11, 2000

(30) Foreign Application Priority Data

Oct. 29, 1998 (JP) .......................................... 10-308945

(51) Int. Cl.[7] ................................................. G06K 9/18
(52) U.S. Cl. ........................ 382/182; 392/311; 392/313
(58) Field of Search ........................ 382/176, 181–182, 382/185, 187, 189, 209, 229, 309, 310, 311, 313, 317

(56) References Cited

U.S. PATENT DOCUMENTS

| | | | | |
|---|---|---|---|---|
| 4,614,978 A | * | 9/1986 | Doster et al. ............... | 358/470 |
| 5,271,067 A | * | 12/1993 | Abe et al. ................... | 382/311 |
| 5,438,436 A | * | 8/1995 | Harris ......................... | 358/500 |
| 5,509,092 A | * | 4/1996 | Hirayama et al. .......... | 382/301 |
| 5,627,661 A | * | 5/1997 | Negishi et al. ............. | 358/470 |
| 6,456,739 B1 | * | 9/2002 | Ikeda ......................... | 382/177 |

OTHER PUBLICATIONS

Rokuto, et al (Computer Translation of Japanese Patent No. 07–028801), pp. 1–46.*
Ie, et al. (Computer Translation of Japanese Patent No. 09–282084), pp. 1–28.*
PCT Rule 56 Written Opinion (in Japanese)—Aug. 15, 2000.
PCT Preliminary Examination Report (in Japanese)—Jan. 16, 2001.

* cited by examiner

Primary Examiner—Daniel Miriam
(74) Attorney, Agent, or Firm—Cook, Alex, McFarron, Manzo, Cummings & Mehler, Ltd.

(57) ABSTRACT

The present invention is directed to providing an image scanner and an optical recognition system using said image scanner which can scan only the "intended region" to carry out character recognition and can carry out character recognition in the background of an application software and can input the recognition result directly to said application software. Image picture data which are captured by scanning the "intended region" of a document with the image scanner mouse 20 are converted to text data by a character recognition software in the personal computer 10 and are inputted directly to an application software. Designation and confirmation of input starting position for the "intended region" on a document are made easily and surely with the LCD26 at hand on the image scanner 20.

12 Claims, 7 Drawing Sheets

IMAGE SCANNER AND OPTICAL CHARACTER RECOGNITION SYSTEM USING SAID IMAGE SCANNER

DETAILED DESCRIPTION OF THE INVENTION

1. Field of the Invention

This invention is broadly concerned with an image scanner and an optical character recognition system using said image scanner, and more particularly with an image scanner and a character recognition system using said scanner which can recognize image characters of any region of a document by optically scanning and can input said character information as character code data to an application software loaded in a personal computer.

In this description, the term "document" means printed matter like book, magazine, newspaper, brochure, visiting card and etc. And the term "character recognition" used in this description means not only recognition of usual character like "kana", "katakana", "kanji" and "alphanumeric" but also recognition of any symbol code image like barcode which can be recognized by a computer and can be converted to character data.

2. The Prior Art of the Invention

In any conventional character recognition apparatus of printed matter (it will be called document hereafter) using a personal computer and at bed or sheet feed scanner (it will be simply called a scanner hereafter), the following operations are needed to recognize printed characters.

(Operation 1) . . . Scanning Document

First, a document is set to a scanner and the document is scanned.

(Operation 2) . . . Character Recognition

The image picture of a whole document sent from said scanner is developed and displayed on a CRT display of a personal computer by character recognition software. After designating by a mouse the region where characters are intended to be recognized (this region will be called "intended region" hereafter) on a character recognition software, the image picture data of the "intended region" are converted to text data (character code data) by using character recognition software and are displayed again on said CRT display.

(Operation 3) . . . Correction

The recognition result by said character recognition software is corrected with key board by comparing the image picture data of said document displayed on said character recognition software with text data which are recognized result.

(Operation 4) . . . Copying or Pasting of said Corrected Text Data to an Application Software.

In the next step, the corrected text data are copied by using a mouse and pasted to application software such as word processor or spreadsheet.

Repetition of Operation.

When more than one document are needed to be recognized, said operation 1 through 4 should be repeated. When more than one "intended region" in a document are needed to be recognized, said operation 2 through 4 should be repeated.

In said conventional character recognition system, parts to be utilized are needed to be cut or copied from a character recognition software and pasted to application software such as word processor or spreadsheet in which the text data, converted character codes, are utilized. In other words, with said conventional technology, the character code converted from image data cannot be utilized simultaneously at a necessary place of application software such word processor or spreadsheet when they are working.

To solve those problem mentioned above, there is an example of prior art found in the disclosure of Japanese Non-examined Patent Publication No. 7-28801, in which character recognition results of needed part of image data can be utilized directly by use of other application software. That is to say, in said prior art, image data including characters are displayed and a designated part of said displayed to character code and said character code are transmitted to application software for document editing or data processing.

The Problem to be Solved by the Present Invention

Document sizes for character recognition used by scanners on the market are usually type A4 form (occasionally type A3) and they are scanned one by one and one page of the document is scanned from end to end. However, actual document to be scanned varies in size from a visiting card size or a book size to a newspaper size. Besides, in many cases, the characters to be scanned and recognized are not all the character of the document but a portion of the document or the characters to be scanned are scattered around the document. In a prior method of character recognition, an example of which is disclosed in Japanese Non-examined Patent Publication No. 7-28801, firstly image data including characters are displayed on a CRT display monitor of a computer. Secondly, the portion to be cut from said displayed image data needs to be designated and after characters in the cut image data are recognized and converted to character code data, they need to be transmitted to application software. Accordingly, if characters to be inputted scatter around document, with said conventional character recognition system, it is impossible to scan only necessary portion of said characters separately from other part of characters which is unnecessary to be inputted. In other words, with conventional character recognition system, whole document including unnecessary part of characters is scanned and clearly said conventional system is inefficient. Besides, said conventional character recognition system can not be used in a way that only necessary part of document is scanned fittingly, recognized and the recognized results are transmitted to application software like word processor while we are reading the document. Besides, in the prior art, after image data are taken into a character recognition software, they are displayed on a CRT display monitor and portions to be recognized are designated by a pointing device like mouse, then direct input of characters to application software made possible. Accordingly, with the prior art we need too many operations to make direct input of preferred characters to application software. The other problem of the prior art is that we cannot check the results of converted character code data before they are taken into character recognition software and accordingly at hand, we can not confirm, correct or change the converted result of image data on the spot. The present invention is aiming to solve said problem of the prior art and provides a scanner and an optical character recognition system using said scanner in which only "intended region" of document can be scanned and characters of said region can be recognized at background of application software and the recognition results can be inputted directly to said application software.

The Method to Solve said Problem

To realize said object, the present invention provides a method that can decide and confirm portion of characters to be taken on a document and can recognize characters in the background of application software and can input the recognition results directly to said application software.

The image scanner of the present invention comprises; an image sensor which retrieves character information on a document as image information by scanning optically characters on said document, an output part which outputs the image information gotten by scanning characters with said image sensor, an input part which inputs the character recognition results of image information outputted by said output part, display part which displays the character recognition results inputted by said input part. Said image scanner is movable on a document so as to designate at will the needed recognition region from the character information of said document. And the conversion results of character image gotten by scanning characters on said document can be confirmed at hand by displaying the character recognition results on said display part. The optical character recognition system of the present invention consists of an image scanner and a personal computer. Said image scanner comprises; an image sensor which scans optically characters on a document and retrieves character information on said document as image information, an output part which outputs the image information gotten by scanning characters on a document with said image sensor to a personal computer, an input part which inputs, from said personal computer, the character recognition results of image information outputted by said output part, a display part which displays said character recognition results inputted by said input part, and an operating part which operates whether the said character recognition results should be fixed or not. The image scanner of the present invention is movable over a document so as to designate willingly the region to be recognized among character information on the document. And conversion results of character information on the document can be confirmed at hand by looking at the character recognition results of designated region of said document displayed in said display part and after fixing the conversion results by operating said operating part, the fixing signal is transmitted to a computer. Said computer should be loaded with at least one application software and a character recognition software which recognize image information outputted by said output part of said image scanner. And when image information scanned by said image sensor is inputted to said computer, the character recognition results by said character recognition software will be transmitted to said image scanner. When the signal of fixing conversion result is transmitted from said image scanner to said computer, the fixed character data will be inputted to the designated position of said application software.

Hereafter, the method of data input of the present invention, that is, the sequence of process of data input in application software such as word processor, spread sheet, data base software etc. is described.

When an image scanner movable over a document scans characters on a document so as to designate regions willingly to be recognized among character information of said document, image data gotten by scanning will be transmitted to a personal computer. After said personal computer retrieves the image data, character recognition software, working at background of application software which deal with data input, will recognize said image data as character and corresponding character code data will be transmitted in bit map format to said image scanner.

When said image scanner receives the character code data, characters are displayed on a display part of said image scanner. When said characters displayed are confirmed as those that are intended to be scanned, a signal notifying completion of correct scanning will be sent to said personal computer.

When said personal computer receives said signal notifying completion of correct scan, said character code data are inputted to application software.

Function block diagram showing embodiment of an optical character recognition system of the present invention.

FIG. 2

Figure 1:
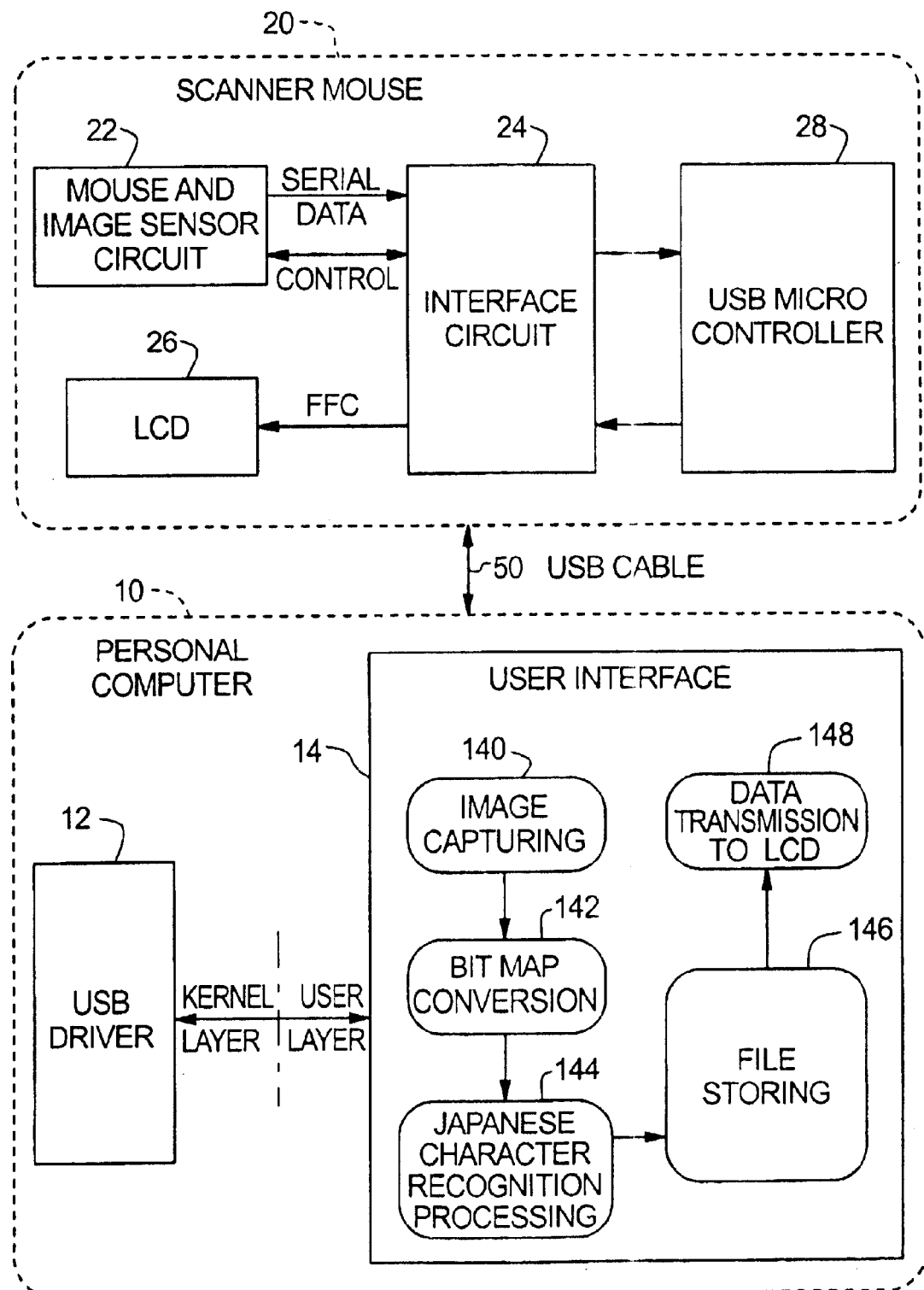
FIG. 1

Schematic diagram of the optical character recognition system shown in FIG. 1.

FIG. 3

Top plan view showing the structure of the scanner mouse shown in FIG. 1.

FIG. 4

Left side view showing the structure of the scanner mouse shown in FIG. 1.

FIG. 5

Sequence diagram showing the flow of process of the optical recognition system shown in FIG. 1.

FIG. 6

Block diagram showing another embodiment of the present invention in which text data of character recognition are inputted directly to an application software.

FIG. 7

Perspective view of another embodiment of image scanner of the present invention.

Preferred Embodiment of the Present Invention

Referring to the attached drawings, the embodiment of an image scanner and an optical scanning system using said image scanner according to the present invention is described hereinafter.

Figure 2:
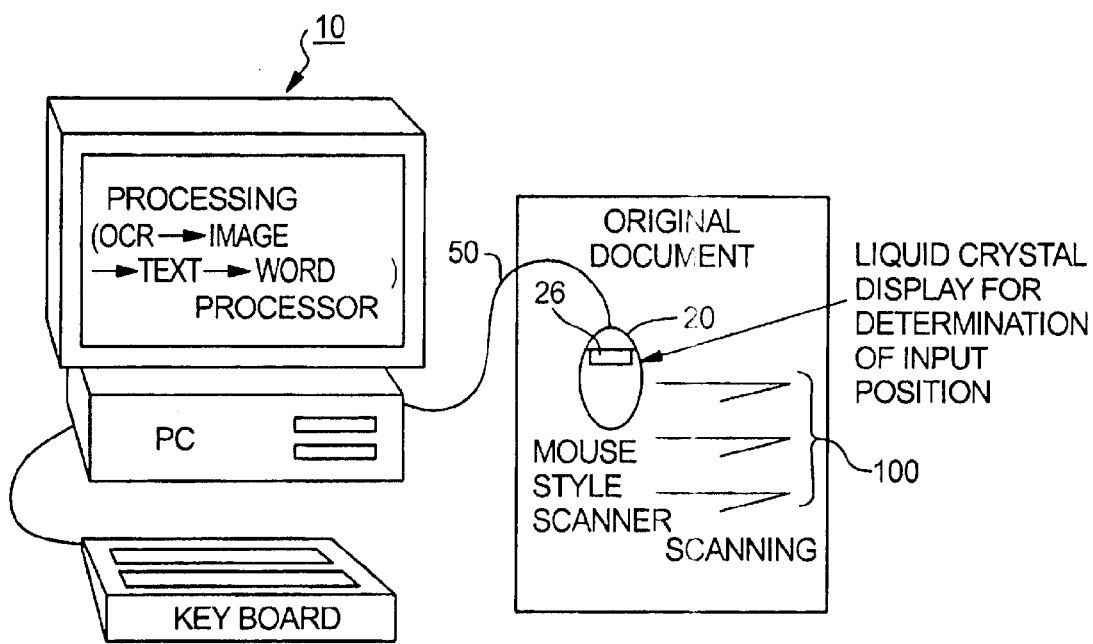

Referring to FIG. 2, there is shown a schematic diagram of the preferred embodiment of an optical character recognition system according to the present invention in which an image scanner takes the form of a scanner mouse.

In FIG. 2, the personal computer 10 is a conventional computer running with an operating system such as Windows 98 of Microsoft which can deal with Universal Serial Bus (it will be called USB hereafter), that is, a high speed bidirectional communication bus.

The personal computer 10 can run with application software such as word processor, spread sheet, database software etc. and, besides, it run with a character recognition software at background of said application software.

In other words, while a character recognition software runs in the personal computer 10, the operator of the computer cannot see the run of said character recognition software but see the run of said application software only and the characters recognized with said character recognition software are inputted to the application software as if they are inputted with a key board.

The personal computer 10 is connected with CRT display or LCD(Liquid Crystal Display) display and is connected with key board. Besides, the personal computer 10 has USB terminal and a scanner mouse 20 is connected to said USB terminal of the computer through USB cable 50. Thus, by connecting said scanner mouse 20 through USB to the personal computer, it is possible to communicate bi-directionally between said scanner mouse and the computer and the computer 10 can supply the scanner mouse 20 with power.

The scanner mouse 20 has united two parts which have different function. The one function is a mouse function which acts as a pointing device of the personal computer 10 and the other is a scanner function which scans document optically and outputs image data. The scanner mouse 20 has an image sensor in its bottom to scan document optically and it can move over any place on a document.

Accordingly, by moving the scanner mouse 20 to an "intended region" where we want to carry out character recognition, we can scan necessary part of characters of a document.

The scanner mouse 20 transmits the scanned image data of "intended region" of a document to the personal computer 10 through USB cable 50. When the personal computer 10 receives the image data, the character recognition software will recognize the image data and the character code, recognition results will be transmitted to the mouse 20 through the USB cable 50. When the scanner mouse receives said character code, the corresponding characters will be displayed on the LCD 26.

Thus, because the character recognition results of scanned region are shown at almost real time on the LCD 26, the recognition results can be confirmed as soon as scanning is done. Accordingly, while scanning is being done, the position (the beginning point or finishing point of scanning) of "intended region" can be adjusted. Moreover, the position of the "intended region" can be changed if necessary and set point (threshold for binary) can be adjusted adequately while image data are being retrieved.

In other words, in this embodiment of the present invention, taking advantage of higher speed character recognition technology owing to improved performance of personal computer and taking advantage of high speed data transmission of USB, the beginning and finishing point of character recognition on a document can be checked with the display part 26 by moving slightly the scanner, when "intended region" is designated. Accordingly, it is possible to designate again "intended region" at this stage if starting and/or finishing point of scanning is not adequate. And when a voice synthesis software is loaded in the personal computer 10, it is possible to know the recognition results by out putting voice without checking the display part 26.

When designation of "intended region" is confirmed and the confirmation is fixed by operating the scanner mouse 20, the recognition results are inputted directly to a cursor position of word processor software or spread sheet software which is running on the personal computer 10. At this moment, in the embodiment of the present invention, the original image data of the character recognition results which were sent to said application software are shown on the personal computer 10 in order to get easy way of correcting possible wrong recognition on said application software. Accordingly, even if some wrong portion is found in the recognition results, the wrong recognized portion can be easily corrected on said application software with a key board by referring to said image data.

When a voice recognition software such as described in the disclosure of Japanese Non-examined Patent Publication No. 7-83353 is loaded so as to amend wrong recognized portion on application software with voice, even inexperienced users of the computer 10 can amend easily wrong recognized portion.

In FIG. 1, there is shown a function block diagram of the personal computer 10 and the scanner mouse 20 which were described in FIG. 2. Referring to FIG. 1, the scanner mouse 20 comprises a mouse and image sensor circuit 22, interface circuit 24, a LCD 26 and USB micro controller 28. In the embodiment of the present invention, the scanner mouse 20 can store said scanned image data, but usually the scanner mouse 20 is connected with a computer and it outputs scanned image data with high speed at real time to the personal computer 10 without storing said image data.

The mouse and image sensor circuit 22 comprises a mouse which works as pointing device of a personal computer and an image sensor which recognizes picture on a document as image data. The mouse and image sensor circuit 22 has also a position sensor circuit which utilizes a position signal of the mouse as position signal of the scanner. The mouse and image sensor circuit 22 is connected with the interface circuit 24 and position information detected by the mouse and image data retrieved by image sensor are outputted to the interface circuit 24 as serial data. The mouse and image sensor circuit 22 carries out also transmitting control signal to the interface circuit 24 and receiving control signal from the interface circuit 24.

The circuit 24 is a interface circuit between the mouse and image sensor circuit 22, LCD 26 and USB micro controller 28. The interface circuit 24 transmits position information detected by a mouse to the USB micro controller 28 at real time and when the interface circuit 24 receives signals of beginning and finishing for scanning and signal of fixing, it will transmit those signals to the mouse and image sensor circuit 22. When the interface circuit 24 receives control data which display characters on the LCD 26 through the USB micro controller 28, it will output the control data (FCC) to the LCD 26. With these control data, corresponding characters will be shown on the LCD 26.

USB micro controller 28 is a controller circuit which comprises controller part controlling the scanner mouse 20 on the whole and USB controller part to transmit and receive data through USB. The USB micro controller 28 is connected with a USB driver of the personal computer 10 through the USB cable 50 and it transmits image data retrieved by the image sensor to the personal computer 10. When the USB micro controller 28 receives character code data from the personal computer 10, it will output control data to the interface circuit 24 to display characters on the LCD 26.

The personal computer 10 comprises USB driver 12 of Kernel Layer which is controlled at OS (Operating System) level and user interface 14 of User Layer which is controlled at application software level. In the interface 14 of the referring figure, there is shown a flow of character recognition process of image data. In the user interface 14 of the referring figure, first, image data received through the USB driver from the scanner mouse 20 are retrieved (140) and secondly they are converted to picture data such as bit map (BMP) etc. (142) and finally Japanese Character recognition is processed (144).

In the process (144), image data received from the scanner mouse 20 are converted successively to character code data of Japanese Character and stored in the file (146). The character code data stored in the file are processed as LCD transmission data (148) at almost real time in bit map format and they are transmitted to the scanner mouse 20 through the USB driver 12. As a result, image data scanned by the scanner mouse 20 are converted to character data at real time by the personal computer 10 and the conversion results of scanning are shown on the LCD 26 at almost the same time that scanning is being done.

Figure 3:
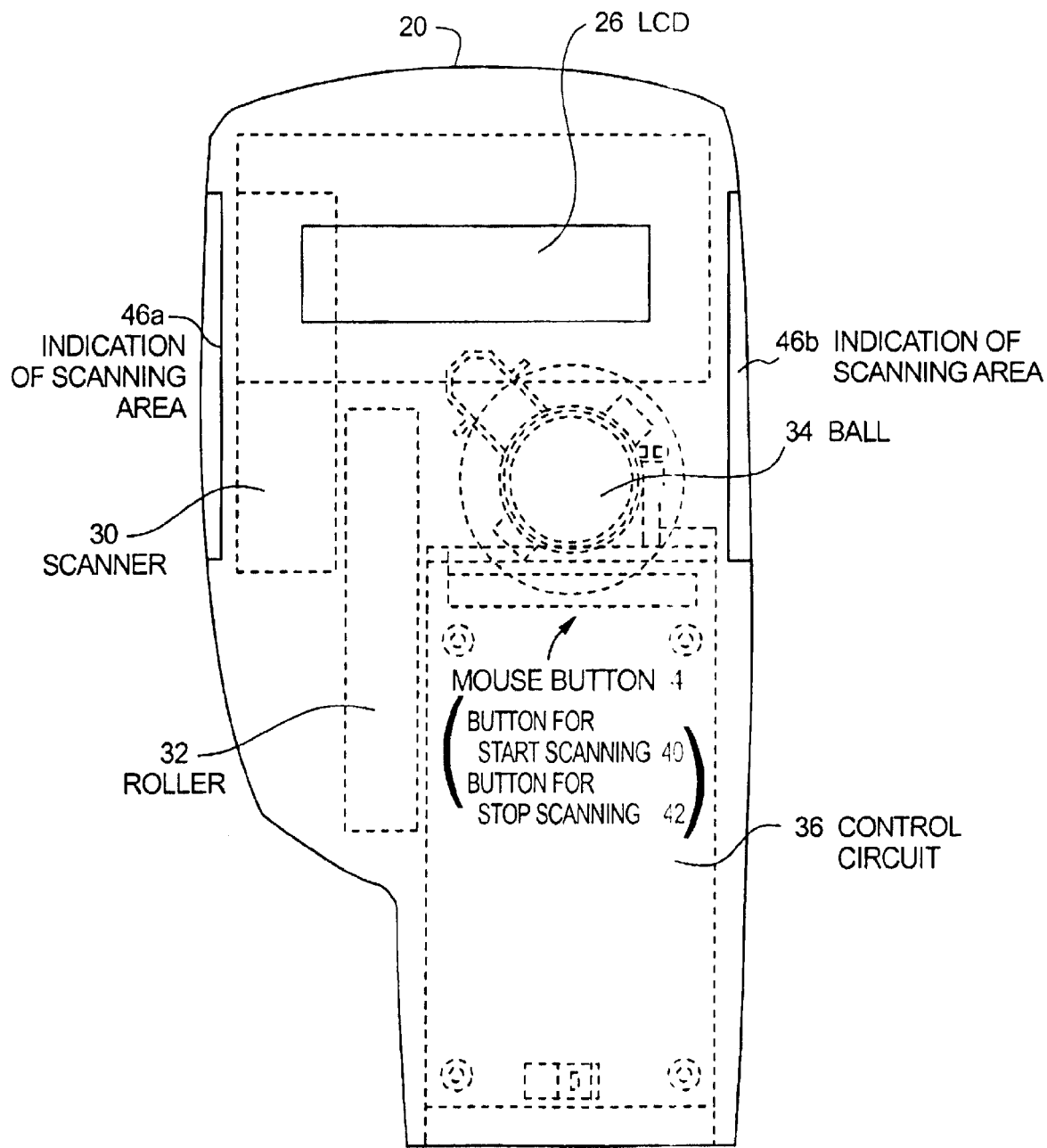
Figure 4:
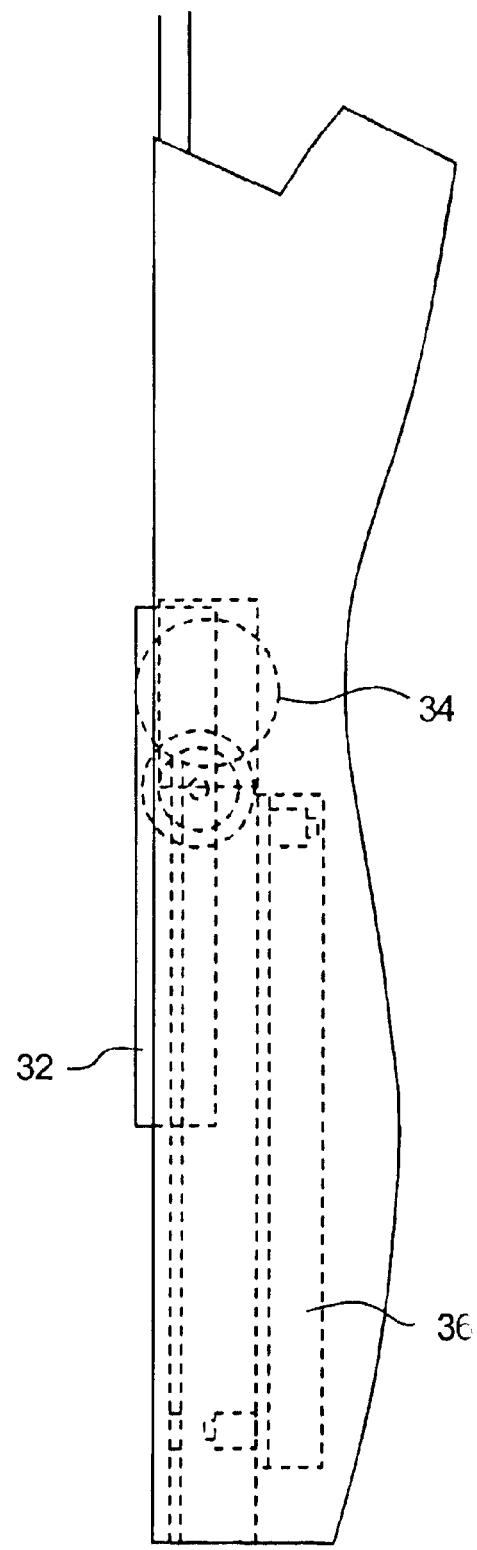

FIG. 3 and FIG. 4 shows top plan view and side elevation view of the scanner mouse 20 respectively which is shown in FIG. 1 and FIG. 2. As shown in the figure, in the scanner mouse 20, there are arranged a scanner 30 having inside an image sensor, a roller 32, a mouse ball 34, and a control circuit 36 controlling the whole scanner mouse 20. The scanner 30, the roller 32 and the ball 34 in FIG. 3 correspond to the mouse and image sensor circuit 22. And the control circuit 36 in FIG. 3 corresponds to the interface circuit 24 and the USB micro controller 28.

The scanner 30 is a contact type image picture sensor and a light source is joined to the image sensor within the scanner 30. The scanner 30 has a super sensitivity image sensor higher than 400 dpi so as to recognize complicated Kanji letters.

The scanner mouse 20 has the LCD 26 at the upper side of its top surface and 2 or 3 mouse buttons 44 are arranged also on the top surface of the scanner mouse 20. The left button 40 is to start scanning and the right button 42 is to fix characters displayed on the LCD 26. On both of the left and right sides of the surface of the scanner mouse 20, the indications 46a, 46b are printed to indicate scanning area. With these indications on the scanner mouse 20, it will be easy to adjust a scanning place on a document.

FIG. 4 is a structural view of the scanner mouse 20 showing its left side view.

As shown in FIG. 4, the scanner mouse 20 has gentle slope on its front part so as to look more easily at the LCD 26 and has a roundness in the rear so as to be securely grasped. The roller 32 is arranged on slightly upper than the ball 34 in order to prevent an influence of the roller 32 on the work of ball 34.

Though not described particularly, we can select by the personal computer 10 which language, Japanese or English, would be scanned or which input, character or picture, would be used etc. These selection may be adjusted also by a control button arranged in the scanner mouse 20 or we may use both of these means, personal computer or control button.

Instead of indications 46a, 46b, a window having the width of the scanner 30 can be made through which document can be seen from the top so as to adjust easily position to scan "intended region".

Referring FIG. 3 and FIG. 4, the operation of the scanner mouse 20 is described hereinafter.

While the scanning button 40 is being pressed down, the scanning is being done. When the scanning start button 40 is pressed down, the scanner mouse will throw light from a light source (not shown) to document surface and the scanner sensor 30 will begin to scan pictures.

As the scanner 30 is arranged perpendicularly to document, image data are retrieved by moving the scanner mouse 20 in the direction of the arrow 100 of FIG. 2. The retrieved image data are outputted to the control circuit 36 and transmitted to the personal computer 10 according to USB protocol through the USB cable 50. Also, when the control circuit 36 receives character code data from the personal computer 10, it will take out corresponding letters from a built-in memory and displays them on the LCD 26.

At this moment, "lines indicating the beginning and the end" of "recognized text" are displayed on the LCD 26. The display of characters on the LCD 26 are related with scanning direction of the scanner 30. To put it concretely, when the scanner 30 moves from the left to the right, characters on the LCD, namely, characters recognition results will firstly appear on the right side of the LCD 26.

And as recognized characters increase, displayed characters will increase with moving from the right end toward the left end. Accordingly, after the first recognized character is displayed, it takes some time for it to disappear.

That means it is possible to confirm easily scanning position. Thus, designation and confirmation of the "intended region" will be easily done. In other words we can determine easily the beginning position and the finishing position of inputting at hand while concentrating attention on document.

After the characters shown on the LCD 26 are confirmed and the button 42 for scanning fixing is pressed down, the control circuit 36 will detect pressing down of the button 42 and will notify the personal computer 10 through the USB cable 50 that confirming and fixing process of character code data has completed. When the personal computer 10 receives this notice, the character code data will be inputted directly to the application software which is running.

In the description of scanning process hereinbefore, scanning is done while the scanning start button 40 is being pressed down, however other embodiment such as described hereinafter is possible. That is to say, once the scanning start button is pressed, the scanning mouse 20 becomes scanning mode and when the scanning button is pressed again, scanning mode is released. In this case, the roller 32 goes down to the position where it touches a document with the first press of the scanning start button 40 and the roller 32 will go back to the original position with the second press. In substitution for the starting button 40 or the fixing button 42 mentioned above, we can utilize the mouse button 44 to start scanning and to fix characters.

Figure 5:
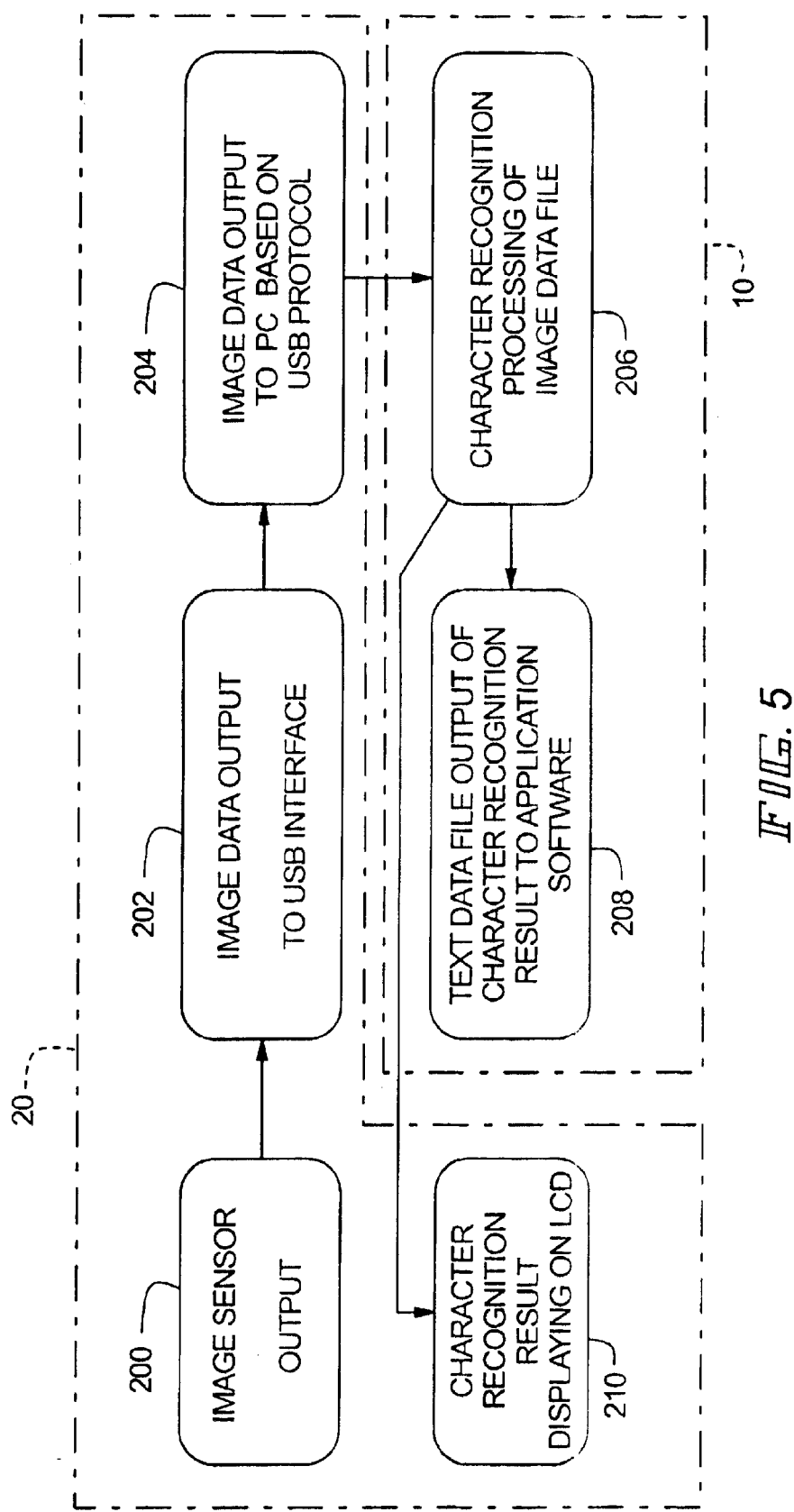

FIG. 5 shows a flow of process sequence in the personal computer 10 and the scanner mouse 20. In this figure, explanations of the process 200, 202, 204, 206 and 210 will be over lapped, so one example of the process 208 is given herein in which recognized text file of character is outputted to an application software after image file is recognized in the process 206.

When character recognized text file is outputted, it is inputted to application software of MS-Word type by making use of "WinExec( )" which is Windows function. Syntax of the "WinExec ( )" is as follows:

UNIT WinExec(LPCSTR IpCmdLine, //address of command line UNIT nCmdShow, //window style for application).

Here, LPCSTR IpCmdLine stands for a bus name of execution file of "WinWord(MS-WORD)" application software and by changing this portion any application file can be designated.

In the embodiment of the present invention, text code data which are character code data by Japanese character recognition process are inputted to application software without changing its form. In a conventional way of inputting data using key board, operating system receives inputted data and makes them code form which are suitable for application software, whereas in the embodiment of the present invention, as mentioned above, several Windows functions are used for inputting data. Also, in the embodiment of the present invention, instead of a single character, a block of characters or a line of characters are inputted at the same time to application software with text form. With these input process, it is possible to input data to application software with text form faster than any other method including key board input.

Figure 6:
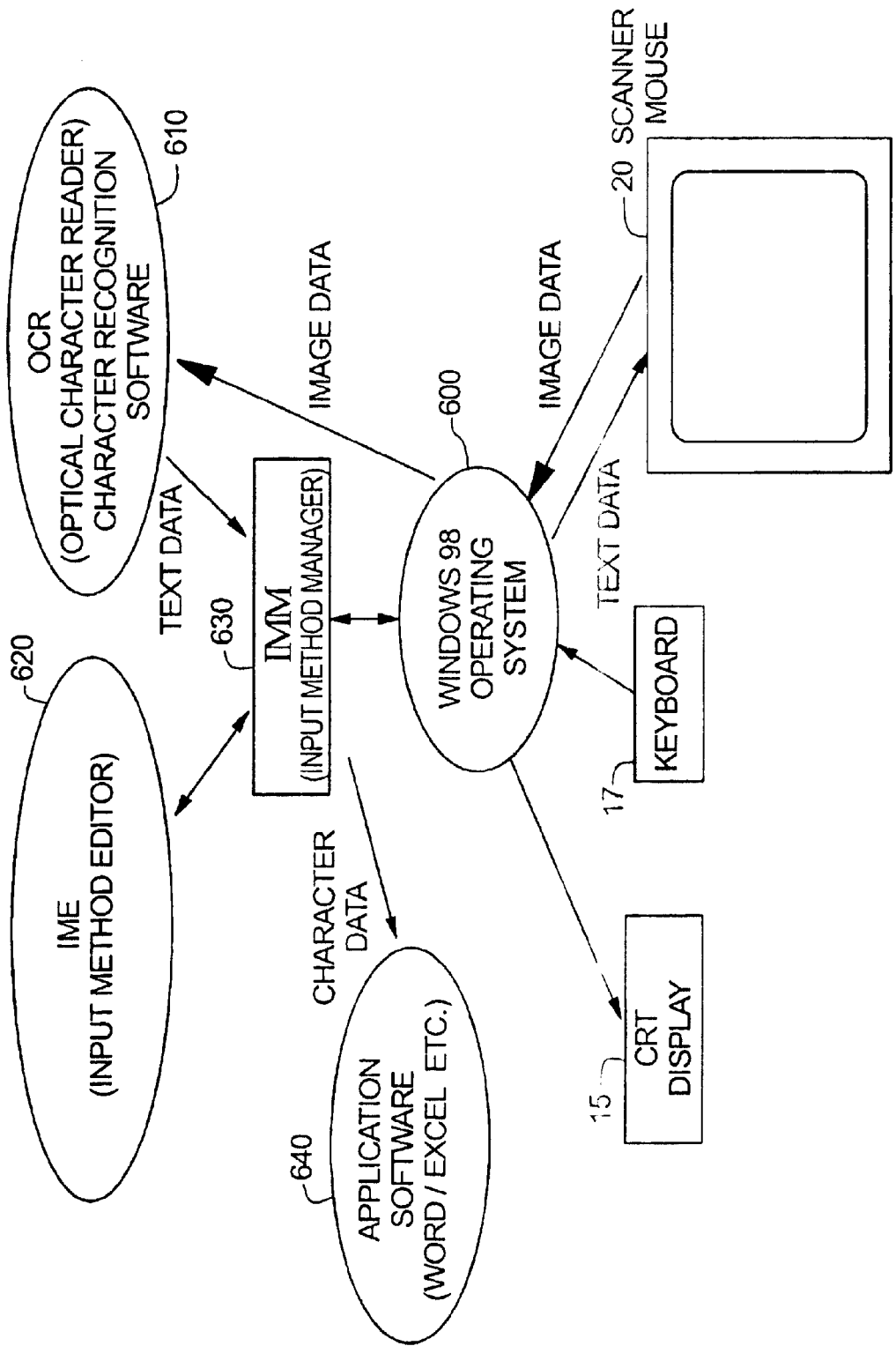

Incidentally, in said embodiment of the present invention, a bus name of execution file must be changed when application software is changed and operator needs to know what application software is used. In FIG. 6, an embodiment improving this point is shown and a flow of processing data in the personal computer 10 is shown.

The operating system 600 is a basic software which manages and controls totally operations of hardware and software. To be concrete, when the operating system 600 receives image data sent from the scanner mouse 20, it outputs said image data to character recognition software 610 running in the background.

Also, the operating system 600 controls system so that scan code inputted from the key board 17 are handed to IMM (Input Method Manager) 630 and converted there to character code and displayed on the display monitor 15.

In the operating system 600. IME (Input Method Editor) 620 is called by IMM 630 and converts scan code inputted from the key board 17 to Japanese language or other Asian language of 2 byte system. In case of English, scan code inputted from the key board 17 is converted to character code by IMM 630.

Therefore, in Japanese version of Windows 98, when character code are inputted to the application software 640, the IMM 630 intervenes among the operating system 600, the character recognition software 610, the Japanese kana kanji conversion software IME 620, and the application software 640.

Thus, we can output character code of the text file of the character recognition software 610 directly to application software by using IMM 630. In this procedure, WN_ME_REPORT message is utilized for carrying character block or character line all at once and WN_CHAR or WN_IME_CHAR message is utilized for carrying single character separately. Therefore, by using IMM 630, we do not need to change execution file for any application software. IMM is stored in system folder of Windows with the name of IMM or WINNLS.

Although an embodiment of the present invention has been described hereinbefore in a case that an image scanner is applied to a scanner mouse, the present invention is not restricted particularly to a scanner mouse.

Figure 7:
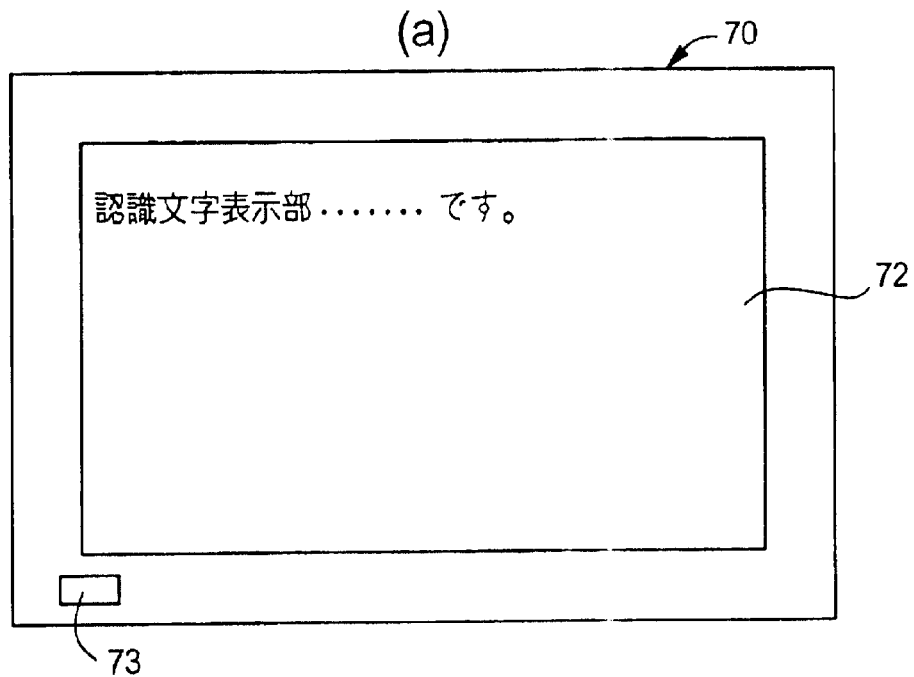
Figure 7:
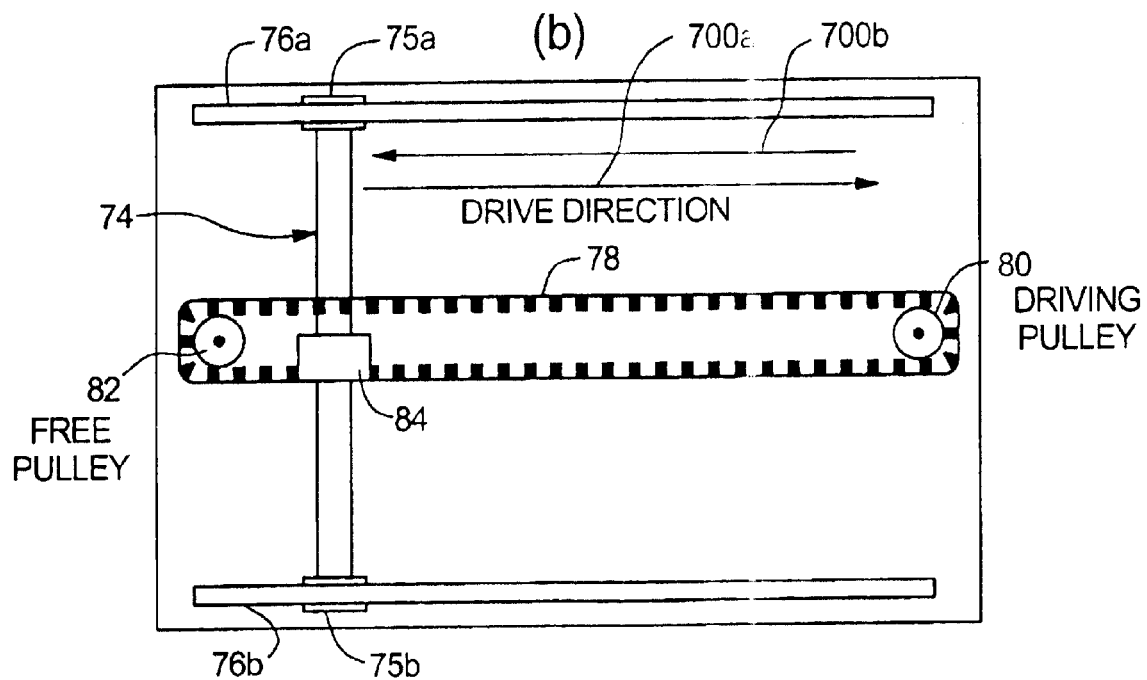

FIG. 7 shows a perspective view of the other embodiment of an image scanner for the present invention. The image scanner 70 shown in FIG. 7 is a plane type image scanner which can recognize character of intended region by putting the scanner over the intended region. It should be understood that the function block diagram shown in FIG. 1 can be applied also to the embodiment described herein.

FIG. 7(*a*) shows plan view of the image scanner 70. As shown in FIG. 7(*a*), the image scanner 70 is a size of a postage card and rectangular shaped and has a liquid crystal film display panel 72 of Japanese language on its top surface which displays recognition results. There is a scanning starting button 73 at the lower left of the liquid crystal film display panel of Japanese language.

The contact image sensor 74 has a structure in which a light source and an image sensor are united and is fixed to slidable portion 75*a*, 75*b*. The slidable portions 75*a*, 75*b* are fitted to the rails 76*a*, 76*b* so as to slide. The contact image sensor 74 is fitted also to the belt 78 with the fixing part 84 which is stretched between the driving pulley 80 and the free pulley 82. Therefore, when the driving pulley 80 turns clockwise, the contact image sensor 74 moves to the direction of the arrow 700*a* and when the driving pulley 80 turns counterclockwise, the contact image sensor 74 moves to the direction of the arrow 700*b*.

To be concrete, when the button 73 is pressed down, the contact image sensor 74 located at the lower left begins to move to the direction of arrow 700*a* by the clockwise turning of the driving pulley 80 and begins to scan a draft put just under the scanner. The moving distance of the image sensor 74 is digitized by an encoder (not shown) placed at the side of the sensor. Scanning to the vertical direction is done by electrical signal within the sensor. Both of the vertical and horizontal digitized signals are transmitted to the image sensor circuit 20 (refer FIG. 1).

The image scanner 70 of the present embodiment is also connected to the personal computer 10 through USB cable and the following process is the same as those of the scanner mouse 20 practically. In case of the scanner mouse 20, a scanner is moved over the scanning range of a document by hand, however in case of the image scanner 70, the scanner is put on a document and the contact image sensor 74 moves to scan. Accordingly, the image scanner 70 is able to scan "intended region" stably.

The embodiment of the present invention has been described in case of a system using Windows 98 with which the present invention is applied favorably. However, it should be understood that operating system applicable to the present invention is not restricted to Windows 98 and the concept of the present invention can be applicable to other operating system such as Windows CE, Macintosh OS and etc.

The Effect of the Invention

As set forth above, by applying the present invention, it is possible to make character recognition of necessary portion of document easily at hand just like using a pen. And by running a character recognition software at background of application software, character code data of recognized characters can be inputted directly to said application software. Therefore, by applying the present invention, characters in a document while looking can be converted to character code data just as inputting characters with keyboard and accordingly labor of character input work will be saved drastically.

What is claimed is:

1. An image scanner device for communicating information with a personal computer installed with a character recognition software and at least one application software, wherein the character recognition software can convert character image information into character code information, said device comprising;
   i) an image sensor means for optically scanning on an intended region of a document so as to retrieve character image information therefrom;
   ii) an output means for sending the character image information retrieved from the intended region to the personal computer;
   iii) an input means for receiving character code information corresponding to the character image information from the personal computer;
   iv) a display means for displaying the character code information; and
   v) an operating means for fixing and sending back the character code information to the personal computer through the output means so that the character code information is introduced at a cursor position for the application software active in the personal computer.

2. The image scanner device of claim 1, wherein said device comprises a pointing function means for the personal computer.

3. The image scanner device of claim 2, wherein said device comprises a scanner mouse means to serve for the pointing function means.

4. The image scanner device of claim 3, wherein said device comprises a sensor circuit for utilizing a positional signal of the scanner mouse means and/or the image sensor means as a positional signal for said device.

5. The image scanner device of claim 2, wherein said device is connected to the personal computer through a high-speed bi-directional communication bus.

6. The image scanner device of claim 1, wherein the character code information is displayed in real time base at the display means and the character code information can be changed until when the intended character code information is fixed.

7. An optical character recognition system comprising an image scanner device and a personal computer installed with a character recognition software and at least one application software, wherein the character recognition software can convert character image information into character code information, said image scanner device comprising:
   i) an image sensor means for optically scanning on an intended region of a document so as to retrieve character image information therefrom;
   ii) an output means for sending the character image information retrieved from the intended region to the personal computer;
   iii) an input means for receiving character code information corresponding to the character image information from the personal computer;
   iv) a display means for displaying the character code information; and
   v) an operating means for fixing and sending back the character code information to the personal computer through the output means so that the character code information is introduced at a cursor position for the application software active in the personal computer.

8. The optical character recognition system of claim 7, wherein said at least one application software contains a voice synthesizer software and the character code information is output from the personal computer in a form of voice information converted by the voice synthesizer software.

9. The optical character recognition system of claim 7, wherein said sat least one application software contains a voice recognition software to amend the character code information in response to a voice instruction to the voice recognition software.

10. A method for inputting data to an optical character recognition system comprising an image scanner device and a personal computer installed with a character recognition software and at least one application software, wherein the character recognition software can convert character image information into character code information, said method comprising the steps of:
   i) optically scanning the image scanner device on an intended region of a document so as to retrieve character image information therefrom;
   ii) transferring the character image information retrieved from the intended region to the personal computer;
   iii) converting the character image information into character code information by the character recognition software in the background of said at least one application active in the personal computer;
   iv) transferring the character code information to the image scanner device;
   v) displaying and fixing the character code information on the image scanner device;
   vi) transmitting the character code information from the image scanner device to the personal computer when the character code information is fixed; and
   vii) introducing the character code information at a cursor position for the application software active in the personal computer.

11. The method of claim 10, wherein said at least one application software contains a program software for utilizing the character code information as 2 byte Asian language and the character code information is introduced into the application software active in the personal computer through the program software.

12. The method of claim 10, wherein the character code information and the character image information are both displayed on the personal computer so that the character code information can be amended with reference to the character image information.

* * * * *